(12) United States Patent
Hoffman et al.

(10) Patent No.: US 7,634,953 B2
(45) Date of Patent: Dec. 22, 2009

(54) NEUTRAL ADJUSTMENT MECHANISM FOR DUAL LEVER STEERING CONTROLS

(75) Inventors: Brad Allen Hoffman, Angier, NC (US); Frank P. Lewis, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 224 days.

(21) Appl. No.: 11/761,725

(22) Filed: Jun. 12, 2007

(65) Prior Publication Data

US 2008/0307918 A1    Dec. 18, 2008

(51) Int. Cl.
*G05G 11/00*    (2006.01)
(52) U.S. Cl. .................. 74/480 R; 74/484 R; 464/148; 464/149; 180/315; 56/11.3
(58) Field of Classification Search .............. 74/479.01, 74/480 R, 484 R, 490; 464/148, 149; 180/315; 56/11.3
See application file for complete search history.

(56) References Cited

U.S. PATENT DOCUMENTS

| | | | |
|---|---|---|---|
| 5,315,893 A * | 5/1994 | Behrens et al. ............... | 74/512 |
| 5,894,714 A * | 4/1999 | Braun et al. .................. | 56/11.4 |
| 6,343,668 B1 * | 2/2002 | Dean ........................... | 180/315 |
| 6,434,917 B1 | 8/2002 | Bartel | |
| 6,739,116 B2 * | 5/2004 | Stover et al. .................. | 56/11.3 |
| 7,284,457 B2 * | 10/2007 | Jinno et al. .................... | 74/1 R |
| 2006/0174601 A1 * | 8/2006 | Piontek ....................... | 56/11.3 |
| 2007/0068711 A1 | 3/2007 | Adkins et al. | |

FOREIGN PATENT DOCUMENTS

EP        1867227        12/2007

* cited by examiner

*Primary Examiner*—David M Fenstermacher

(57) ABSTRACT

A neutral adjustment mechanism for dual lever steering controls. The dual lever steering controls include two levers that are each independently pivotable forward and reverse to drive a zero turning radius mower. The neutral adjustment mechanism includes a control pivot connected to each lever of the dual lever steering controls that pivots with forward and reverse pivoting of each lever. A steering link has a first end with an adjustment point, a ball joint adjacent the adjustment point connecting the steering link to the control pivot, and a second end pivotably connected to an input control lever of a hydrostatic transmission pump. An operator seat may be positioned over the steering links. Under the operator seat, adjustment access holes are provided for adjusting the steering links while the operator seat remains in place.

15 Claims, 3 Drawing Sheets

Figure 1:
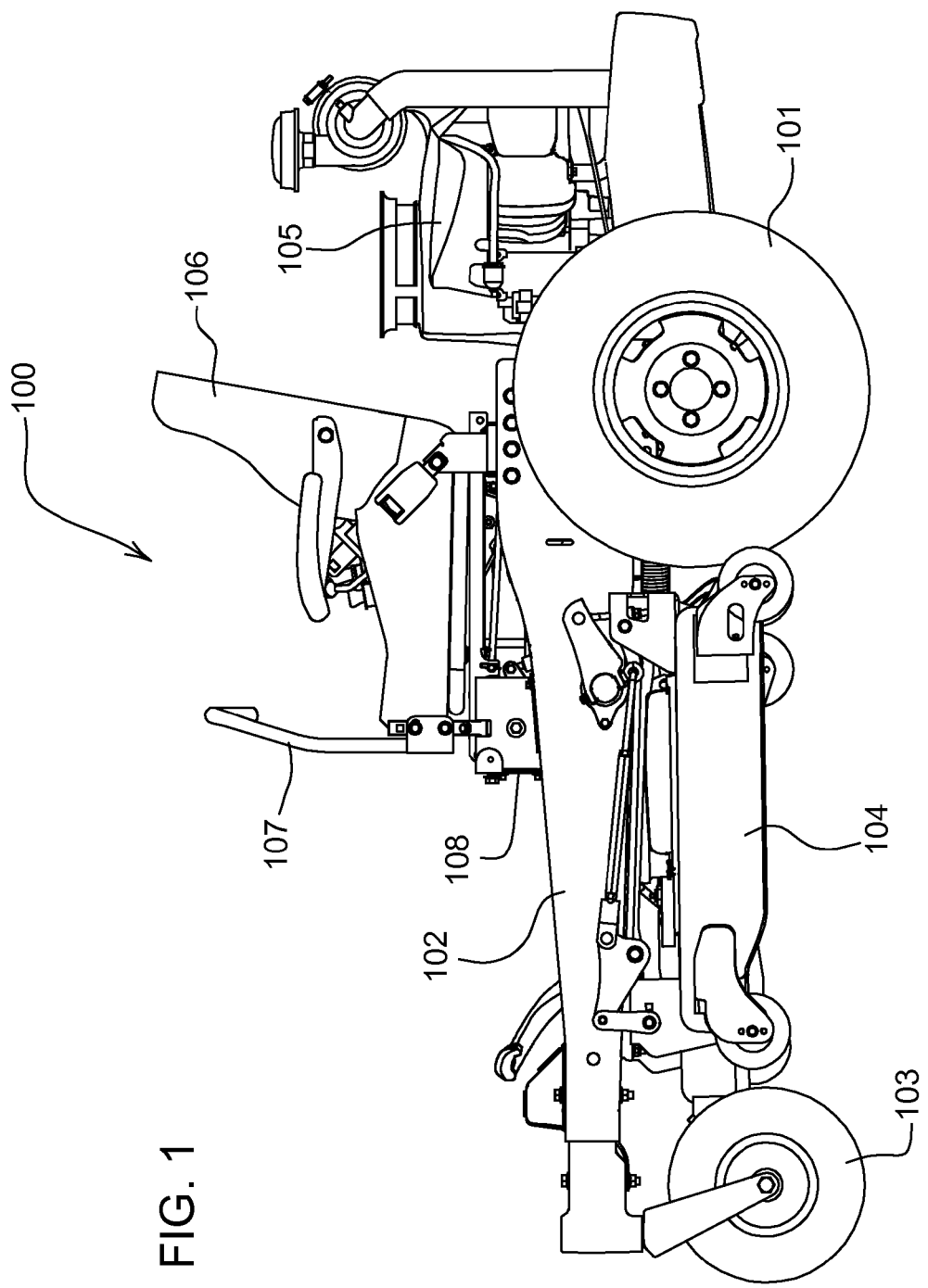
Figure 2:
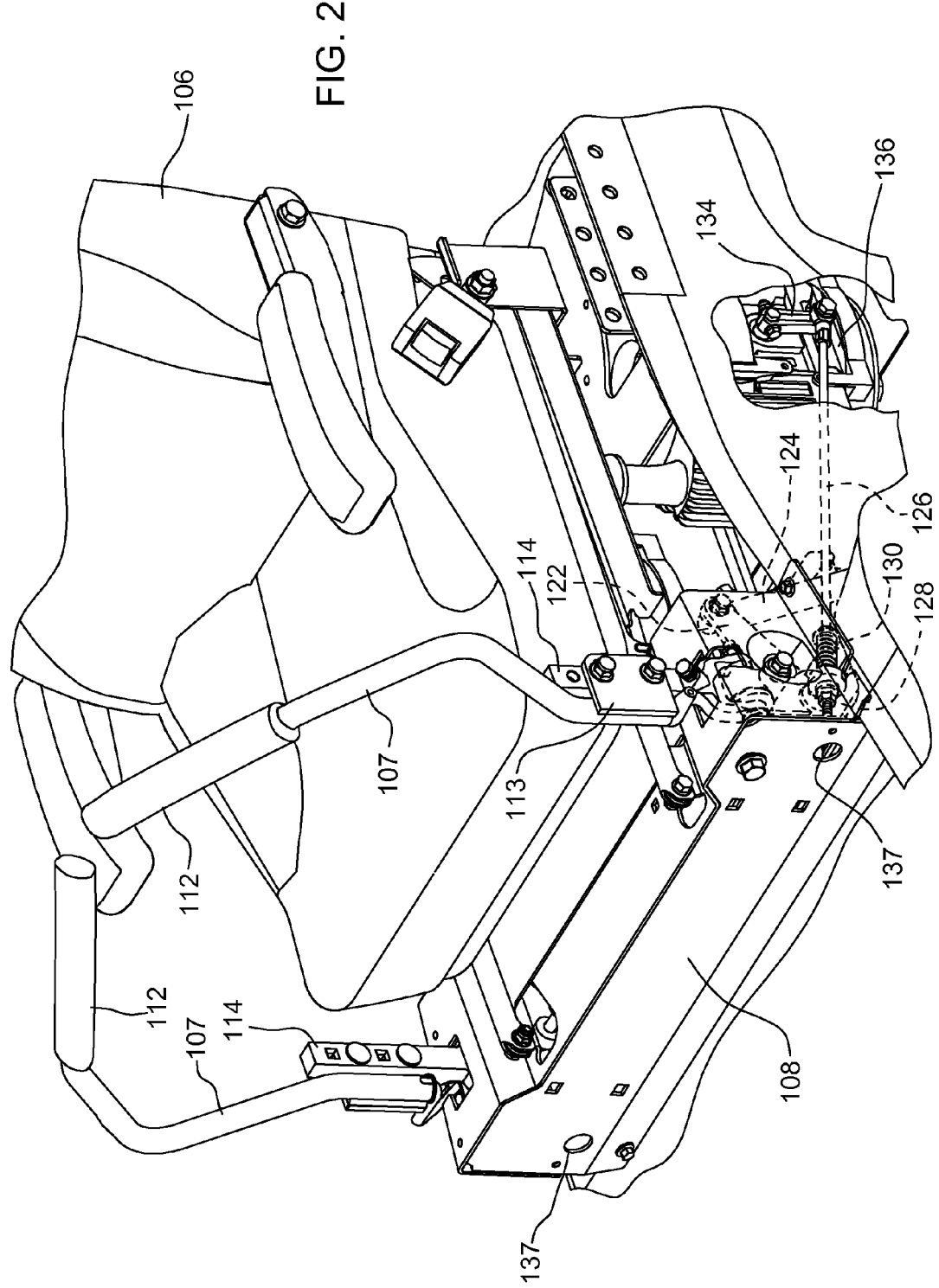
Figure 3:
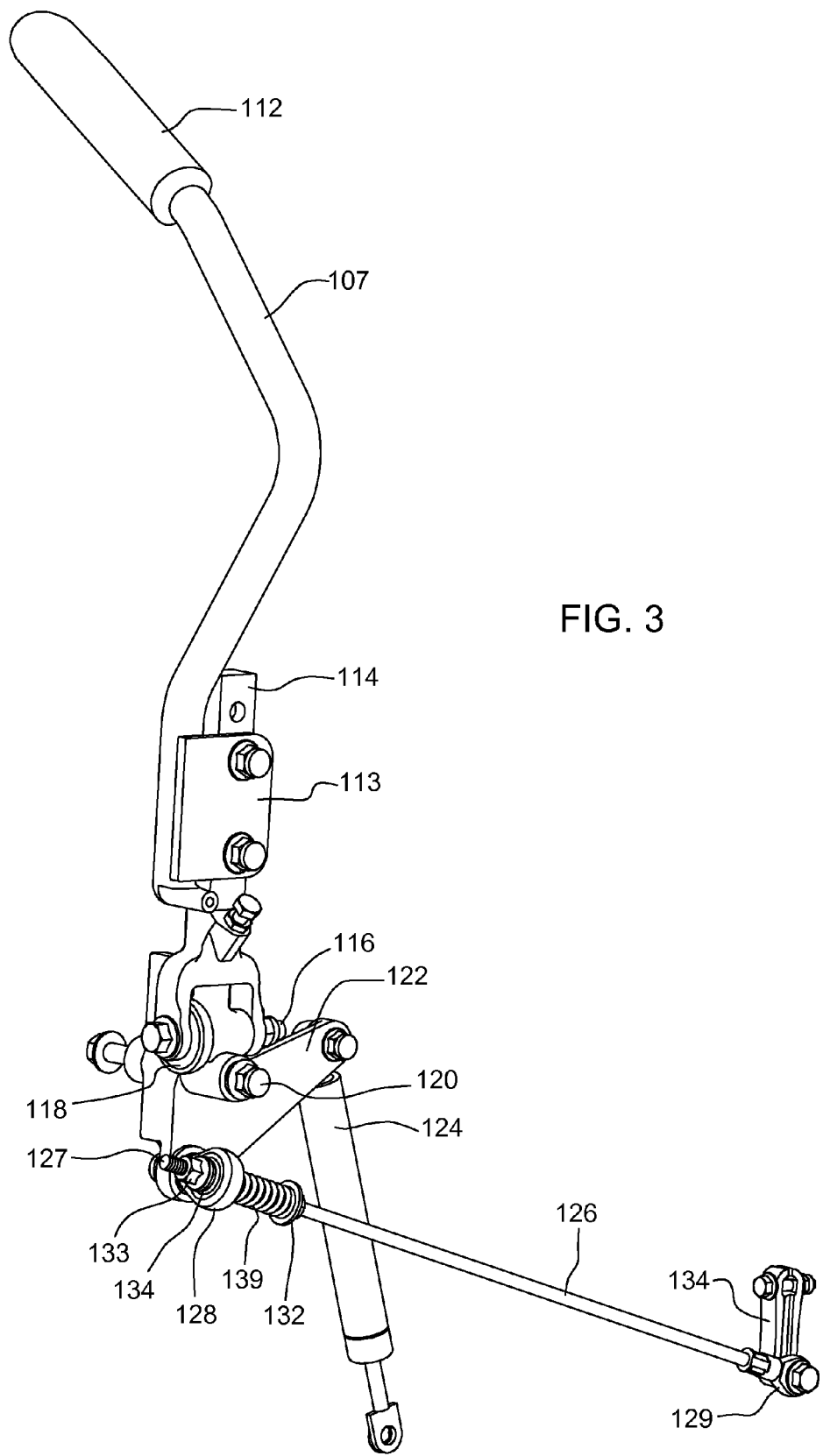

NEUTRAL ADJUSTMENT MECHANISM FOR DUAL LEVER STEERING CONTROLS

FIELD OF THE INVENTION

This invention relates to grass mowing machines, and specifically to zero turning radius ("ZTR") mowers having independently powered left and right drive wheels controlled by a pair of control levers or sticks.

BACKGROUND OF THE INVENTION

Grass mowing machines known as zero turning radius ("ZTR") mowers have at least one independently powered drive wheel on each side of a frame. One drive wheel may be operated in a forward direction while the other drive wheel may be stopped or operated in reverse. Many ZTR mowers have a twin stick control system. A pair of control levers or sticks may be provided side-by-side, with each lever or stick controlling one of the drive wheels. When both levers or sticks are advanced together forwardly out of their neutral position, both drive wheels rotate forwardly to cause the mower to move forward. A ZTR mower may be steered by advancing one lever or stick more than the other.

Typically, each control lever or stick on a ZTR mower may be linked to a pump arm of one of two separate hydraulic pumps, or of a dual hydraulic pump; i.e., a separate pump for each wheel. The lever or stick may be used to move a pump swash plate through a direct linkage.

The control levers or sticks on a ZTR mower may be mounted on the vehicle frame so that each has a first pivot axis allowing the lever or stick in the operating position to pivot forwardly in an arc to turn the wheel in forward, or pivot rearwardly to turn the wheel in reverse. Additionally, the operator can pivot each lever or stick to a neutral operating position, and then pivot each lever or stick outwardly in an arc to a non-operating or park position. If both levers or sticks are pivoted to neutral, the ZTR mower should be stationary, both levers or sticks should be at the same position, and both levers or sticks should align with slots so that they can pivot outwardly to park. An operator may need to make neutral adjustments to the linkages if the levers or sticks are misaligned in the neutral position, due to wear, age or loosening of components of the ZTR mower.

Neutral adjustments for levers or sticks on ZTR mowers typically require the operator to step off the machine to make the adjustments. The operator may have to flip up the seat or remove a panel to access the adjustment points. Once the operator can access the steering linkages, he or she must loosen the links, which may be include turnbuckle and/or jam nuts, to make the adjustments. The operator then must retighten the steering linkages. The operator also may need to lift the rear of the unit off the ground to prevent the machine from moving during the adjustment.

There is a need for a simple and inexpensive neutral adjustment mechanism for dual lever steering controls on a ZTR mower that does not require the operator to get off the machine while making the adjustments. A neutral adjustment mechanism is needed that does not require flipping up a seat, removing a panel, lifting the rear of the machine, or turning off the machine to access the adjustment points. A neutral adjustment mechanism is needed that allows adjustments to be performed with minimal effort.

SUMMARY OF THE INVENTION

A neutral adjustment mechanism for dual lever steering controls on a ZTR mower includes a pair of adjustable length steering links, each steering link connecting between one of the steering levers and a hydrostatic transmission pump. Each steering link is moveable axially with forward and reverse pivoting of the steering lever to which it is connected. Each steering link includes an easily accessible adjustment point that can be turned to adjust the length of the steering link with minimal effort and without stepping off the mower, shutting down the mower, or moving the operator seat.

BRIEF DESCRIPTION OF THE DRAWINGS

FIG. 1 is a perspective view of a ZTR mower having a neutral adjustment mechanism for dual lever steering controls according to a first embodiment of the invention.

FIG. 2 is a perspective view of a neutral adjustment mechanism for dual lever steering controls on a ZTR mower according to a first embodiment.

FIG. 3 is a perspective view of the neutral adjustment mechanism of the first embodiment.

DESCRIPTION OF THE PREFERRED EMBODIMENT

The present invention may be used with zero turning radius ("ZTR") mower 100 shown in FIG. 1, having at least one drive wheel 101 on each side that is independently powered to rotate independently of the other drive wheel. Each independent drive may include a separate hydrostatic drive motor coupled to each wheel. The pair of drive motors may be connected via hydraulic conduits to a dual hydrostatic pump; i.e., a separate pump for each wheel. Each side of the dual hydrostatic pump may have a swash plate that may define a pump stroke between a neutral position and a full forward position. The ZTR mower may have a frame 102 supported on a forward end by front wheels 103, and suspending a mower deck 104 between the front and rear wheels. The ZTR mower may have a rear-mounted engine 105 behind an operator seat 106. The seat may be mounted over the frame for a seated operator to use left and right control arms 107, here shown in the neutral position. As will be explained in more detail below, linkages between the control arms and dual hydrostatic pump may be located under the operator seat, and behind panel 108.

Now referring to FIG. 2, left and right motion control levers or sticks 107 may be used to drive a ZTR mower. Each control lever or stick may be mounted to the ZTR mower so that the lever may pivot forwardly to move a swash plate in a hydrostatic pump in a first direction to cause a drive wheel to rotate forward, or pivot rearwardly to move the swash plate in a second direction to cause the drive wheel to rotate backward. Each control lever or stick may have a neutral position in which the corresponding drive wheel is at rest. The pair of control levers or sticks may be mounted in front of operator's seat 106 on a ZTR mower.

In one embodiment, the lower end of each control lever or stick 107 may be mounted so that each lever or stick can move independently of the other. In FIG. 1, both levers or sticks are in the neutral position. Each control lever or stick may have a grip 112 at its first or upper end, and may be fastened with bolts through bracket or plate 113 to neutral position lever 114 at its second or lower end. The neutral position lever may pivot on a first axis defined by shaft or threaded fastener 116 extending through forward/reverse lever 118. Each forward/reverse lever may pivot on a second axis defined by a transverse shaft or threaded fastener 120 that is perpendicular to the first axis. Control pivot 122 may be connected to each lever of the dual lever steering controls, so that the control pivot can pivot with forward and reverse pivoting of each lever. Control pivot 122 may be integrally formed with and extend generally rearwardly from forward/reverse lever 118. Damper 124 and steering linkage 126 each may be separately fastened to control pivot 122 as will be explained below.

In one embodiment, steering link 126 may be a rod having a first end 127 and a second end 129. The steering link moves axially in response to forward or reverse pivoting of a steering lever to which it is connected. The steering link may have an adjustment point adjacent the first end. Front ball joint 128 may be adjacent the adjustment point, and may connect the steering link to control pivot 122. The second end of the steering link may be pivotably connected to an input control lever of a hydrostatic transmission pump.

In one embodiment, steering link 126 adjacent the first end 127 may be externally threaded. The adjustment point may be threaded to the steering link so that it may be rotated to change the position of the steering link relative to front ball joint 128. The adjustment point can change the length of the steering link between front ball joint 128 and the input control lever of a hydrostatic transmission pump. The first end 127 of the steering link may extend through and beyond front ball joint 128 mounted to control pivot 122. The first end of the steering link may be shifted fore or aft by turning adjustment point 133, to change the length of steering link 126 between front ball joint 128 and hydrostatic pump 136. Washer 134 or resilient collar may be positioned around steering link 126 between front ball joint 128 and adjustment point 133.

In one embodiment, compression spring 130 may be positioned around the steering link between front ball joint 128 and stop 132 which may be a collar or threaded fastener on the steering linkage. The second end of steering link 126 may be pivotably attached with swivel joint 129 to input control lever 134 of hydrostatic pump 136. The compression spring around the steering link may provide tightening force against the adjustment point. Damper 124 may be fastened to the frame of the ZTR mower.

In one embodiment, adjustment points 133 are positioned so that they can be easily accessed from the front end of the ZTR mower. Operator seat 106 may be located over the steering links. Panel 108 may be a vertical or near-vertical sheet metal member positioned in front of and below the operator seat, in front of the steering links. Panel 108 may have neutral adjustment access holes or openings 137 for adjusting each steering link. With the operator seat in place, the seat is above the neutral adjustment access holes, but does not block access to the holes. Each adjustment point 133 is easily accessible behind a neutral adjustment access hole 137 in panel 108 in front of seat 106. Positioning the adjustment points behind neutral adjustment access holes 137 allows an operator to make adjustments to steering links 126 from the seat or front of a ZTR mower, without removing panels or flipping the seat. The operator may turn the adjustment points using a control knob or a socket to adjust each steering link to a neutral position, even while the ZTR mower is running in neutral. Making the adjustments to the steering links while operating the mower in neutral may help the operator obtain correct steering link lengths in the neutral position.

In one embodiment, springs 130 behind front ball joints 128 allow adjustment of steering links 126 to the neutral position without loosening linkage hardware. Each spring 130 may be preset to a specified spring force, and springs having different rates may be used to obtain softer or harder feel for the forward/reverse controls. For example, the spring force can be changed to prevent the machine from being too aggressive in forward or reverse with a rapid control stroke. Additionally, the springs on the steering links can prevent damage to the ZTR steering system if the operator were to bottom out the stroke transmission while actuating the control levers.

Having described the preferred embodiment, it will become apparent that various modifications can be made without departing from the scope of the invention as defined in the accompanying claims.

The invention claimed is:

1. A neutral adjustment mechanism for dual lever steering controls having a pair of levers that are each independently pivotable forward and reverse to drive a zero turning radius mower, comprising:

a control pivot connected to each lever of the dual lever steering controls that pivots with forward and reverse pivoting of each lever;

a steering link having a first end with an adjustment point, a ball joint adjacent the adjustment point connecting the steering link to the control pivot, and a second end pivotably connected to an input control lever of a hydrostatic transmission pump;

an operator seat positioned over the steering link; the adjustment point accessible for changing the position of the steering link relative to the ball joint to move the levers to a neutral position between forward and reverse while the hydrostatic transmission pump is in a neutral position with the operator seat in place.

2. The neutral adjustment mechanism of claim 1 further comprising a spring between the ball joint and a stop.

3. The neutral adjustment mechanism of claim 1 further comprising a damper pivotably connected to the control pivot.

4. The neutral adjustment mechanism of claim 1 further comprising a panel in front of the steering links and having neutral adjustment access holes through which the adjustment points can be accessed.

5. A neutral adjustment mechanism for dual lever steering controls having two levers that are each independently pivotable forward and reverse to drive a zero turning radius mower, comprising:

a steering link connected to each lever, each steering link having a length between a ball joint and a hydrostatic transmission input control arm, each steering link moving axially in response to forward or reverse pivoting of the lever;

an adjustment point threaded to each steering link and rotatable to change the length of the steering link to bring each lever into a neutral position between forward and reverse while each hydrostatic transmission input control arm is in a neutral position;

a spring around each steering link to provide tightening force against the adjustment point; and a panel in front of the adjustment points having neutral adjustment access openings through which each adjustment point may be rotated.

6. The neutral adjustment mechanism of claim 5 further comprising a damper connected to each input control arm.

7. The neutral adjustment mechanism of claim 5 wherein the first end of the steering link is threaded.

8. The neutral adjustment mechanism of claim 5 wherein the lever is outwardly pivotable in a neutral position.

9. The neutral adjustment mechanism of claim 5 further comprising an operator seat over the steering link and neutral adjustment access openings.

10. A neutral adjustment mechanism for dual lever steering controls having two levers that are each independently pivotable forward and reverse to drive a zero turning radius mower, comprising:

a pair of adjustable length steering links, each steering link connecting between one of the levers and a hydrostatic transmission pump, each steering link moveable axially with forward and reverse pivoting of the steering lever to which it is connected;

an operator seat over the steering links; and a pair of access holes under the operator seat through which the length of the steering links may be adjusted without lifting the seat to bring each steering lever to a neutral position between forward and reverse while the hydrostatic transmission pump is in a neutral position.

11. The neutral adjustment mechanism of claim 10 wherein each adjustable length steering link has a threaded end with an adjustment point threaded thereto.

12. The neutral adjustment mechanism of claim 11 further comprising a spring to hold the adjustment point in place.

13. The neutral adjustment mechanism of claim 10 further comprising a ball joint between each steering link and lever.

14. The neutral adjustment mechanism of claim 10 further comprising a damper connected to each lever.

15. The neutral adjustment mechanism of claim 10 wherein each lever is pivotable outwardly from a neutral position.

* * * * *